May 24, 1932. A. MERDAN 1,859,977
HEAT CONTROL EMERGENCY PLUG
Filed May 14, 1930
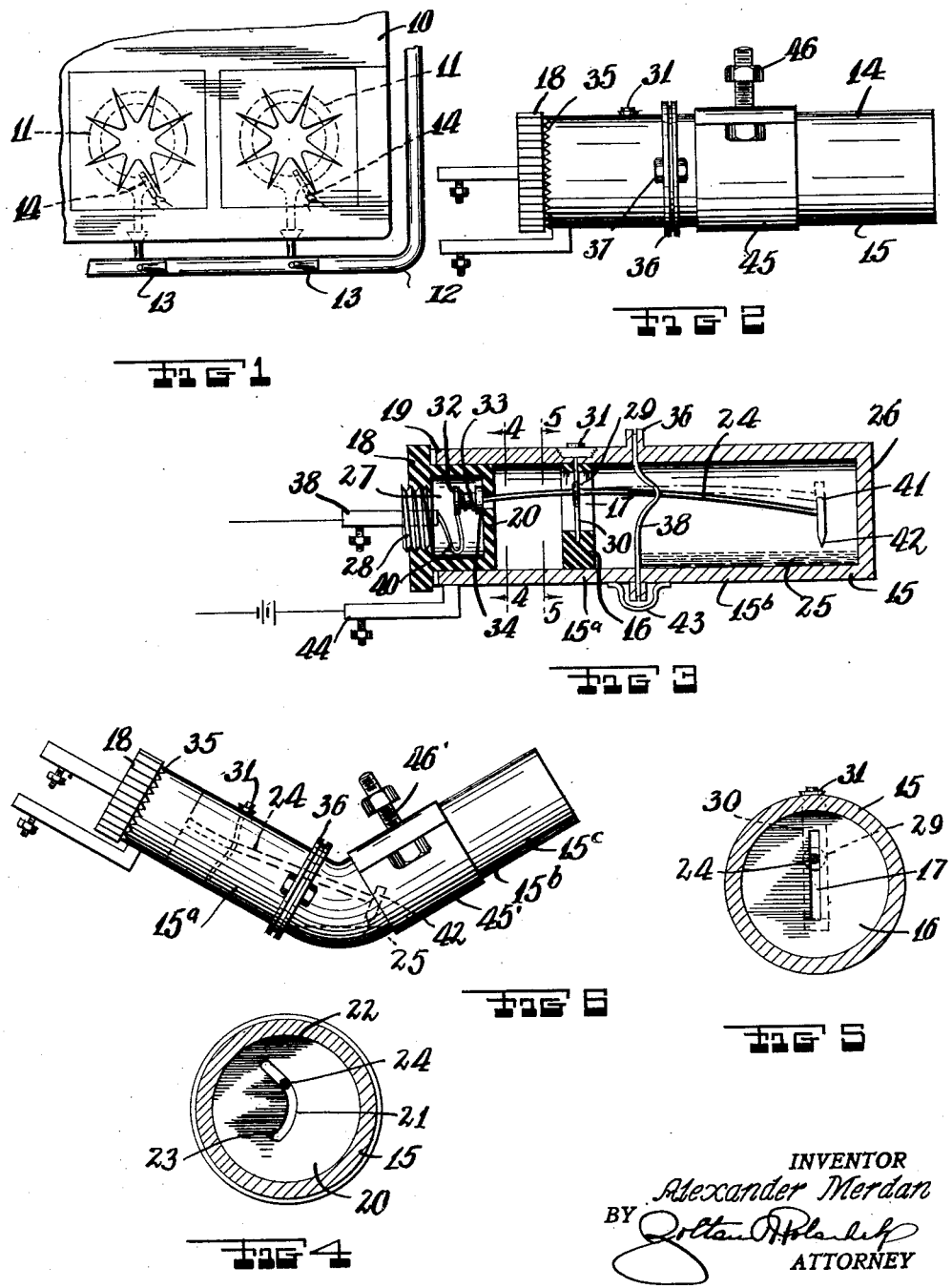
INVENTOR
Alexander Merdan
BY
ATTORNEY Patented May 24, 1932

1,859,977

UNITED STATES PATENT OFFICE

ALEXANDER MERDAN, OF NEW YORK, N. Y., ASSIGNOR TO CHARLES OSAD, OF JERSEY CITY, NEW JERSEY

HEAT CONTROL EMERGENCY PLUG

Application filed May 14, 1930. Serial No. 452,289.

This invention relates to new and useful improvements in a heat control emergency plug.

The invention has for an object the provision of a device of the class mentioned which is of simple durable construction, dependable in use and efficient in action, and which can be manufactured and sold at a reasonable cost.

The invention proposes a safety heat control emergency plug for positioning adjacent a burner or other device which is to be watched, in contact therewith, for giving alarm during periods of danger. The safety heat control plug may be placed along various points in a building or upon the burners of a gas range to ring an alarm when temperatures in the vicinity rise above a predetermined amount. The heat control emergency plug may also be placed upon the engine of a vehicle to open the ignition switch upon heating. Numerous other uses can also be made of the device.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a fragmentary plan view of a range constructed according to this invention.

Fig. 2 is an enlarged side elevational view of one of the control plugs shown in Fig. 1.

Fig. 3 is an elevational vertical sectional view of Fig. 2.

Fig. 4 is a transverse vertical sectional view taken on the line 4—4 of Fig. 3.

Fig. 5 is a transverse vertical sectional view taken on the line 5—5 of Fig. 3.

Fig. 6 is a view similar to Fig. 2, but illustrating another embodiment.

In Fig. 1 a gas range 10 has been illustrated provided with burners 11 connected with a gas supply pipe 12 having control valves 13 for each individual burner. A heat control emergency plug 14 is shown attached upon each of the burners 11 for connection with some device for turning off the valve 13 upon overheating of the burner or upon fire in the vicinity. If it is so desired, just one heat control plug 14 may be used and be connected to control a main valve in the gas supply pipe 12. The apparatus for operating the valves 13 or switches in the event that the control plug is placed upon the motor of a vehicle is not a portion of this invention and need not be described in this specification.

The safety heat control plug comprises a cylindrical container 15 with a transverse partition 16 having a vertical slot 17, a plug 18 rotative in one end 19 of said container 15 and formed with an inner transverse wall 20 having a curved slot 21 extending from near the periphery 22 to near its center 23, means for holding said plug 18 in various rotative adjusted positions, a contact rod 24 slidably extended thru said vertical slot 17 and into said curved slot 21, a heat expandible substance 25 within said container 15, and an electrical circuit including said contact rod 24 and expandible substance 25 so that said plug 18 may be turned for positioning said control rod 24 from said expandible substance 25 to close said circuit upon a predetermined expansion of said substance.

The cylindrical container 15 should preferably be made of iron, though other metals may also be used. A second choice would be aluminum. The container 15 has one of its ends closed by an element 26. The transverse partition 16 is formed from some insulation material and is suitably attached within the container 15. The plug 18 is also formed of some insulation material and its inner transverse wall 20 is spaced from the front so as to present a hollow portion 27. A stopper 28 threadedly engages thru the front of the plug 18, for communication with the hollow 27.

The contact rod 24 is attached upon a collar 29 slidable in a groove 30 formed in the transverse partition 16. This groove 30 extends completely thru the container 15 so that the collar 29 may be engaged within the groove 30 and thereafter the rod 24 engaged thru the collar. A plug 31 threadedly engages on the side of the container 15 and normally closes the groove 30. The means for holding said plug 18 in various adjusted rotative positions consists of a head element 32 formed upon the rod 24 and engaged within the hollow 27 of the plug. A spring 33 is arranged upon the rod 24 and acts between the head 32 and a washer 34 resting against the wall 20. A plurality of interengaging serrations 35 are arranged upon a portion of the plug 18 and the edge of the container 15. The spring 33 urges the wall 20 inwards which in turn causes the entire plug 18 to be urged upwards. Therefore, the plug is urged against the edge of the container 15 and as a result the serrations formed upon the contacting surfaces engage. Thus free rotation of the plug is prevented.

The heat expandible substance 25 may be mercury or any other element. The container 15 is made from two container sections, namely 15ª and 15ᵇ. The adjacent ends of these sections are provided with flanges 36 and bolts 37 connect these flanges together. A diaphragm 38 is engaged between the flanges 36 so as to extend transversely across the container 15 and divide off a portion of the container for the holding of the said mercury 25. The contact rod 24 engages thru the diaphragm 38 so as to extend into the portion of the container provided with the mercury, and the diaphragm is of material which permits raising or lowering of the contact rod so that the latter element may be positioned various distances from the surfaces of the mercury.

The electrical circuit before referred to may be traced from a terminal 39 mounted upon the stopper 28 and extending thru into the hollow 27. A flexible lead 40 connects the terminal 39 with the head 32 of the contact rod 24. A contact disc 41 is attached upon the contact rod 24 and is formed with sharp edges 42 for contacting with the mercury 25. The circuit then continues thru the mercury and is grounded to the container 15. A lead 43 serves to connect the sections of the container so as to allow the continuance of the passage of the current. The circuit is concluded with a terminal 44 attached upon the casing 15. The plug may be connected in series with a source of current and with an electrical control for the operation of valves or switches.

In Fig. 2, a clamp 45 has been shown encircling the container 15 and provided with bolts 46 for attachment upon a burner or other element. In Fig. 6 a clamp 45' has been shown with a bolt 46' for attaching the device in a manner similar to that expressed relative to Fig. 2. The form in Fig. 6 differs from that shown in Fig. 2 in that a container 15ᶜ has been used which is of curved formation. In other respects, all of the parts are similar to those of the preferred form and may be recognized by corresponding numerals.

In operation of the device, it is attached upon burners, the engine of a vehicle or other place, and then the plug 18 pulled laterally outwards so that the serrations 35 disengage and then turned for causing the contact head 41 to just make contact with the mercury 25. From this position the plug 18 is rotated in the opposite direction so as to cause the contact head 41 to separate from the mercury 25 a predetermined distance given preferably by a scale supplied with the device and directed by instructing the turning of a certain number of the serrations 35 relative to each other. In this manner the head element 41 may be positioned from the mercury at any predetermined distance.

Rotation of the plug 18 causes the curved slot 21 to move the contact rod 24 up or down within the groove 17. Flexing of the diaphragm 38 permits such movements. Upon overheating of an element to which the device is attached, the substance 25 will expand and close the circuit for causing the giving of an alarm or for the turning off of valves or switches.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A heat control emergency plug, comprising a cylindrical container with a transverse partition having a vertical slot, a plug rotative in one end of said container and formed with an inner transverse wall having a curved slot extending from near the periphery to near its center, means for holding said plug in various adjusted rotative positions, a contact rod slidably extended thru said vertical slot and into said curved slot, a heat expandible substance within said container, and said plug may be turned for positioning said contact rod from said expandible substance for closing an electrical circuit upon a predetermined expansion of said substance.

2. A heat control emergency plug, comprising a cylindrical container with a transverse partition having a vertical slot, a plug rotative in one end of said container and formed with an inner transverse wall having a curved slot extending from near the periphery to near its center, means for holding said plug in various adjusted rotative positions, a contact rod slidably extended thru said vertical slot and into said curved slot, a heat expandible substance within said container, and said plug may be turned for positioning said contact rod from said expandible substance for closing an electrical circuit upon a predetermined expansion of said substance, said means for holding said plug in various rotative positions includes serrations on the plug interengaging with serrations on said container.

3. A heat control emergency plug, comprising a cylindrical container with a transverse partition having a vertical slot, a plug rotative in one end of said container and formed with an inner transverse wall having a curved slot extending from near the periphery to near its center, means for holding said plug in various adjusted rotative positions, a contact rod slidably extended thru said vertical slot and into said curved slot, a heat expandible substance within said container, and said plug may be turned for positioning said contact rod from said expandible substance for closing an electrical circuit upon a predetermined expansion of said substance, said means for holding said plug in various rotative positions includes serrations on the plug interengaging with serrations on said container, and resilient means for moving said plug so as to cause engagement of said serrations.

4. A heat control emergency plug, comprising a cylindrical container with a transverse partition having a vertical slot, a plug rotative in one end of said container and formed with an inner transverse wall having a curved slot extending from near the periphery to near its center, means for holding said plug in various adjusted rotative positions, a contact rod slidably extended thru said vertical slot and into said curved slot, a heat expandible substance within said container, and said plug may be turned for positioning said contact rod from said expandible substance for closing an electrical circuit upon a predetermined expansion of said substance, said container being made of two sections bolted together, a diaphragm separating said sections and closing off one portion of the container for the holding of said heat expandible substance.

5. A heat control emergency plug, comprising a cylindrical container with a transverse partition having a vertical slot, a plug rotative in one end of said container and formed with an inner transverse wall having a curved slot extending from near the periphery to near its center, means for holding said plug in various adjusted rotative positions, a contact rod slidably extended thru said vertical slot and into said curved slot, a heat expandible substance within said container, and said plug may be turned for positioning said contact rod from said expandible substance for closing an electrical circuit upon a predetermined expansion of said substance, said container being made of two sections bolted together, a diaphragm separating said sections and closing off one portion of the container for the holding of said heat expandible substance, said contact rod extending thru a diaphragm between said container sections so as to extend within the portion of the container provided with said heat expandible substance.

6. A heat control emergency plug, comprising a cylindrical container with a transverse partition having a vertical slot, a plug rotative in one end of said container and formed with an inner transverse wall having a curved slot extending from near the periphery to near its center, means for holding said plug in various adjusted rotative positions, a contact rod slidably extending thru said vertical slot and into said curved slot, a heat expandible substance within said container, and said plug may be turned for positioning said contact rod from said expandible substance for closing an electrical circuit upon a predetermned expansion of said substance, said transverse partition being formed with a groove receiving a collar attached upon the contact rod and constituting the slidable mounting of the contact rod thru the partition.

7. A heat control emergency plug, comprising a cylindrical container with a transverse partition having a vertical slot, a plug rotative in one end of said container and formed with an inner transverse wall having a curved slot extending from near the periphery to near its center, means for holding said plug in various adjusted rotative positions, a contact rod slidably extended thru said vertical slot and into said curved slot, a heat expandible substance within said container, and said plug may be turned for positioning said contact rod from said expandible substance for closing an electrical circuit upon a predetermined expansion of said substance, said means for holding said plug in various rotative positions comprises a head element formed on said rod, a spring acting between said head and said plug for normally urging said plug inwards, and interengaging serrations formed upon both the container and the plug.

In testimony whereof I have affixed my signature.

ALEXANDER MERDAN.